(12) United States Patent
Kao (10) Patent No.: US 6,543,628 B1
(45) Date of Patent: Apr. 8, 2003

(54) ELECTRICALLY CYCLING CD RACK

(76) Inventor: Kuo-Ming Kao, 23F-3, No. 508, Sec. 5, Chung-Hsiao E. Rd., Taipei (TW)

( * ) Notice: Subject to any disclaimer, the term of this patent is extended or adjusted under 35 U.S.C. 154(b) by 0 days.

(21) Appl. No.: 10/038,620

(22) Filed: Jan. 8, 2002

(51) Int. Cl.⁷ ................................................ A47G 29/00
(52) U.S. Cl. ................ 211/40; 211/121; 206/308.1; D6/630
(58) Field of Search ................ 211/40, 41.12, 211/1.51, 121, 163; D6/630; 206/308.1

(56) References Cited

U.S. PATENT DOCUMENTS

| | | | | |
|---|---|---|---|---|
| 718,752 A | * | 1/1903 | Findley | 211/121 |
| 1,736,866 A | * | 11/1929 | Wagner et al. | 198/484.1 |
| 2,969,867 A | * | 1/1961 | McClelland | 198/385 |
| 3,720,451 A | * | 3/1973 | Anders | 198/798 |
| 3,722,743 A | * | 3/1973 | Atchley | 198/801 |
| 4,026,617 A | * | 5/1977 | Bosio et al. | 198/701 |
| 5,464,091 A | * | 11/1995 | Callahan et al. | 206/308.3 |
| 5,520,279 A | * | 5/1996 | Lin | 206/308.1 |
| 5,672,512 A | * | 9/1997 | Shaw | 198/801 |
| 5,765,695 A | * | 6/1998 | Picciallo | 211/40 |
| 5,924,564 A | * | 7/1999 | Lin | 206/308.1 |
| 6,202,861 B1 | * | 3/2001 | Mah | 211/40 |
| D440,456 S | * | 4/2001 | Christianson | D6/456 |
| 6,321,946 B1 | * | 11/2001 | Merchant | 222/135 |
| D454,022 S | * | 3/2002 | Christianson | D6/456 |

FOREIGN PATENT DOCUMENTS

DE 19602585 A1 * 7/1997 ........... G11B/33/04

* cited by examiner

Primary Examiner—Daniel P. Stodola
Assistant Examiner—Khoa Tran
(74) Attorney, Agent, or Firm—Varndell & Varndell, PLLC (57) ABSTRACT

An electrically cycling CD rack comprising a base, two lateral plates, a gearing device and a lot of clamping seats, the base is perpendicularly connected with the two lateral plates, the gearing device is fixedly provided between the two lateral plates with a motor of which an output axle is provided thereon with a gear, the gear is engaged with a cog device movably and rotatably provided between the two lateral plates, the cog device are connected with the clamping seats; an adjustment box is provided under the cog device to connect the clamping seats. A CD displaying rack having an effect of convenient assembling as well as fast and stable clamping, suitable for viewing and with high storing capability can be obtained.

2 Claims, 9 Drawing Sheets

ELECTRICALLY CYCLING CD RACK

BACKGROUND OF THE INVENTION

1. Field of the Invention

The present invention is related to an electrically cycling CD rack, and especially to a structure that moves CD's in clamping seats with a gearing device; by designing of mutual connecting of the connecting portions of the clamping seats, an effect of convenient assembling as well as fast and stable clamping can be provided. Thereby, a CD displaying set that is suitable for viewing and is of high storing capability can be obtained.

2. Description of the Prior Art

Since CD's with higher quality, larger storage capacity as well as longer life span were widely used, the way of storing CD's has been always thought highly of by manufacturers and users. CD storage and arrangement devices thereby have been developed.

However, most conventional CD racks each are provided therein with a smaller storing room for mounting a CD casing, an edge of the storing room is provided with two hooks, while the other opposite edge is provided with corresponding engaging areas, a CD casing is fixed in a receiving chamber recessed and provided in the storing room. The four walls of a CD rack are provided respectively with two sets of dovetail grooves and dovetail blocks; by engaging the dovetail blocks in the dovetail grooves on other CD racks, a plurality of CD racks can be connected mutually. Although multiple CD's can be simultaneously displayed in the CD racks, they occupy quite a large volume, and the space for displaying CD is relatively limited. The positions of displaying are either overly high or overly low and make inconvenient viewing or taking off and placing in. Hence such CD racks are disadvantageous in occupying large areas, limited displaying positions as well as a small number of CD's for displaying in the CD racks.

SUMMARY OF THE INVENTION

The primary object of the present invention is to provide an electrically cycling CD rack, in which, by providing a plurality of control peddles on a base to connected with a gearing device to manipulate forward and rearward rotation of CD's in their clamping seats, space needed to display and store the CD's can be reduced. Such a CD rack is convenient for viewing and has a high storing capacity.

Another object of the present invention is to provide an electrically cycling CD rack, in which, by mutual connecting of the connecting portions of the clamping seats and with a designing of receiving space of the clamping seats, an effect of convenient assembling as well as fast and stable clamping can be provided. Thereby, practicality and convenience of the CD rack can be obtained.

To achieve the aforesaid objects, the present invention is comprised of a base, two lateral plates, a gearing device and a lot of clamping seats. The base is perpendicularly connected with the two lateral plates, the gearing device is disposed between the two lateral plates and is provided with a motor. At the axle of the motor is provided with a gear in engagement with a cog device. The cog device is connected with the clamping seats. An adjustment box is provided under the cog device to connect with each clamping seat. In this mode, an effect of convenient assembling as well as fast and stable clamping can be provided, a CD rack convenient for viewing and having a high storing capacity is formed, and practicality and convenience of the CD rack can be obtained.

The present invention will be apparent after reading the detailed description of the preferred embodiment thereof in reference to the accompanying drawings.

DETAILED DESCRIPTION OF THE PREFERRED EMBODIMENT

Referring to FIGS. 1–6, the electrically cycling CD rack of the present invention is comprised of a base 1, two lateral plates 2, a gearing device 3 and a lot of clamping seats 4.

The base 1 is connected with the two lateral plates 2 thereon; two control peddles 34, 36 are provided on the base 1 to connect the gearing device 3.

The gearing device 3 is provided between the two lateral plates 2 each with a track plate 7 on the inner side thereof. A linear slit 75 is provided on the outside surface of each track plate 7 to hide an electric wire therein. The track plate 7 is provided on the upper portion thereof with an axle 71, a curved groove 72 is provided on the upper portion and extends to the two lateral sides; the track plate 7 is provided on the inside thereof with two positioning grooves 73 formed from raised separating strips, a plurality of holes 74 are provided in the two positioning grooves 73 for firmly connecting with two fixing plates 8. A fixing folded sheet 311 is provided between the two track plates 7 for fixedly mounting a motor 31 of which an output axle is provided thereon with a gear 32, the gear 32 is engaged with a cog device movably and rotatably provided between the two track plates 7. The cog device can be a gear box 33 with outer teeth 331 which are connected with the gear 32; the outer teeth 331 of the gear box 33 are also connected to the clamping seats 4. An adjustment box 35 is provided under the gear box 33; an extended slide block 351 is provided beneath the adjustment box 35 and is provided with a slide groove 352 in corresponding to a connecting portion 41 of each clamping seat 4 for sliding and cycling of the connecting portions 41 of the clamping seats 4. The adjustment box 35 is provided with two elongate grooves 353 on the two side edges thereof to be fixed with screws 354 for mounting and detachment as well as adjustment for positioning.

The clamping seats 4 each has two connecting portions 41 on the two ends of the bottom thereof, each connecting portion 41 is provided on the bottom thereof with a recess 413 for providing therein a protruding end 411 and a receiving hole 412. The clamping seats 4 each has a receiving space 44, and is provided with two "U" shaped insertion slots 42 on the bottom edge thereof, two transverse protrusions 43 are provided between the two "U" shaped insertion slots 42 close to the front and the rear walls of the clamping seat 4 for clamping the casing of a CD.

With the electrically cycling CD rack formed from the above members, referring to FIGS. 2–6, the present invention is characterized by that, the base 1 is perpendicularly connected with the two lateral plates 2 and is connected with the gearing device 3 which controls the motor 31. The motor 31 is fixedly provided on the output axle thereof with the gear 32 in engagement with the outer teeth 331 of the gear box 33 for rotating the gear box 33. The outer teeth 331 of the gear box 33 are connected with the recesses 413 provided on the bottoms of the connecting portions 41 of the clamping seat 4. All the clamping seats 4 are mutually connected by connecting of the protruding ends 411 and receiving holes 412 on the neighboring connecting portions 41, so that the mutually connected clamping seats 4 can be driven for rotating. The protruding ends 411 and receiving holes 412 mutually connected beneath the clamping seat 4 smoothly slide in the curved grooves 72 extended to the two lateral sides of each track plate 7. The two "U" shaped insertion slots 42 provided on the bottom edge of each clamping seat 4 make the two transverse protrusions 43 provided between the front and the rear walls of the clamping seat 4 elastic, so that when protrusions 61 provided on the casing of a CD 6 contact the two transverse protrusions 43 between the front and the rear walls of the clamping seat 4, the transverse protrusions 43 are pushed outwardly to allow insertion of a CD casing into the inner bottom of the clamping seat 4; at the same time, the transverse protrusions 43 are elastically restored to their normal positions to make engagement of the transverse protrusions 43 with the corresponding protrusions 61, thereby, the clamping seat 4 is firmly engaged with the CD 6. Hence assembling is completed fast, and a large amount of CD's can be stored in the extremely small space; and the CD's 6 rotated to the upper area can be spread in a radiating form to be convenient for viewing by an operator. Therefore, an effect of convenient assembling as well as fast and stable clamping can be provided, an electrically cycling CD rack having a high storing capacity and with a reduced displaying and storing space is formed, and practicality and convenience of the CD rack can be obtained.

Figure 1:
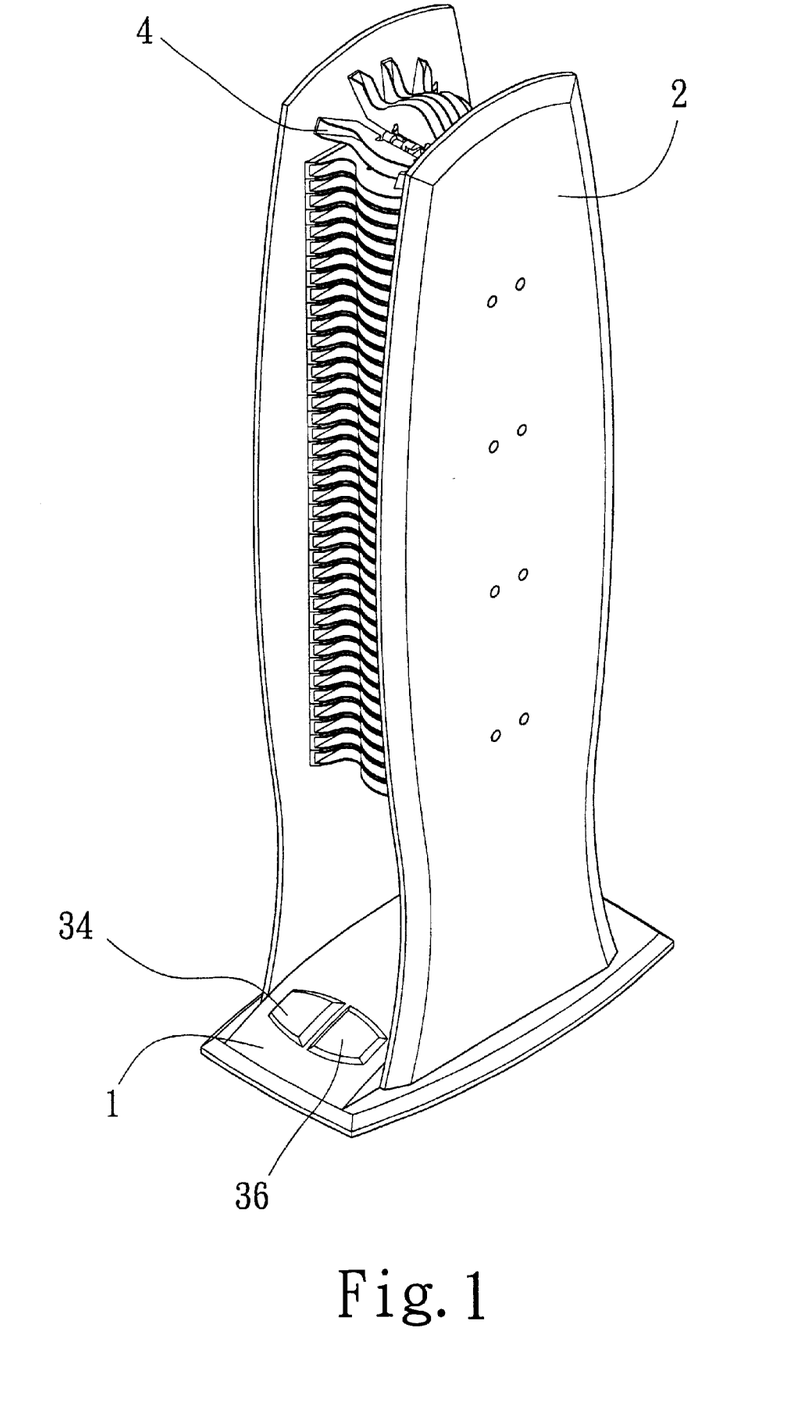
FIG. 1 is a perspective view showing the appearance of the present invention.
Figure 2:
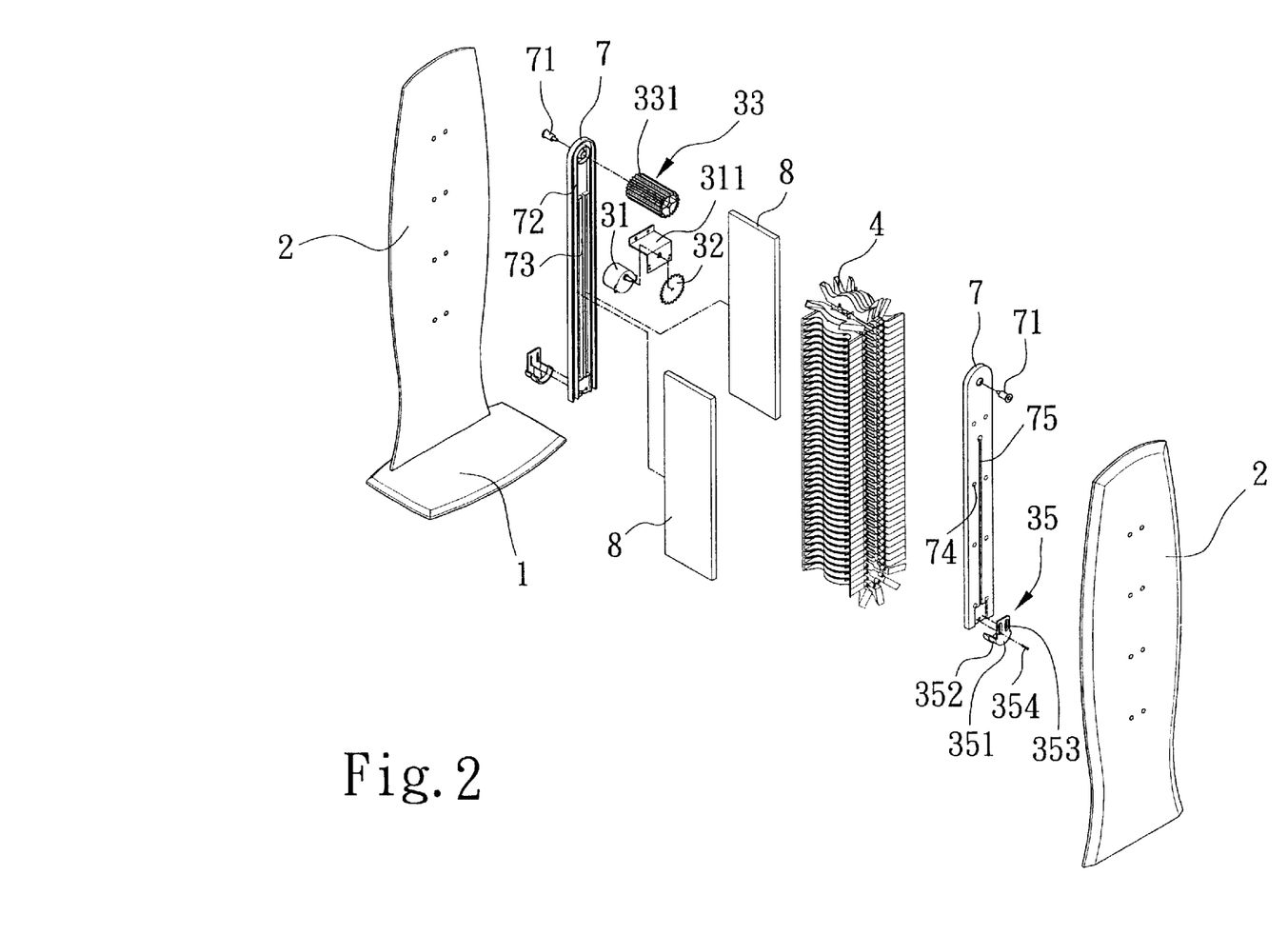
FIG. 2 is an exploded perspective view showing the element of an embodiment of the present invention.
Figure 3:
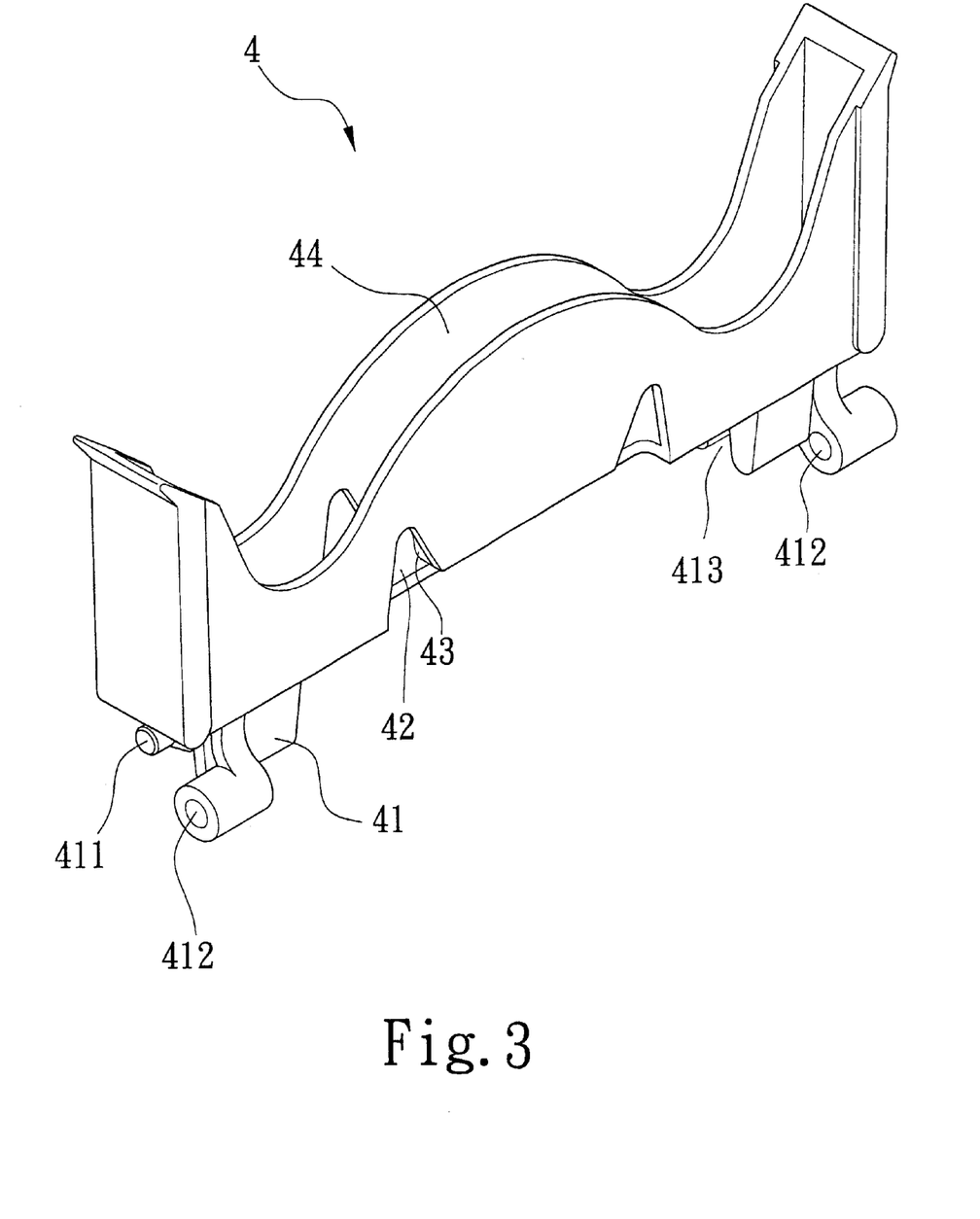
FIG. 3 is a perspective view showing a clamping seat of the embodiment of the present invention.
Figure 4:
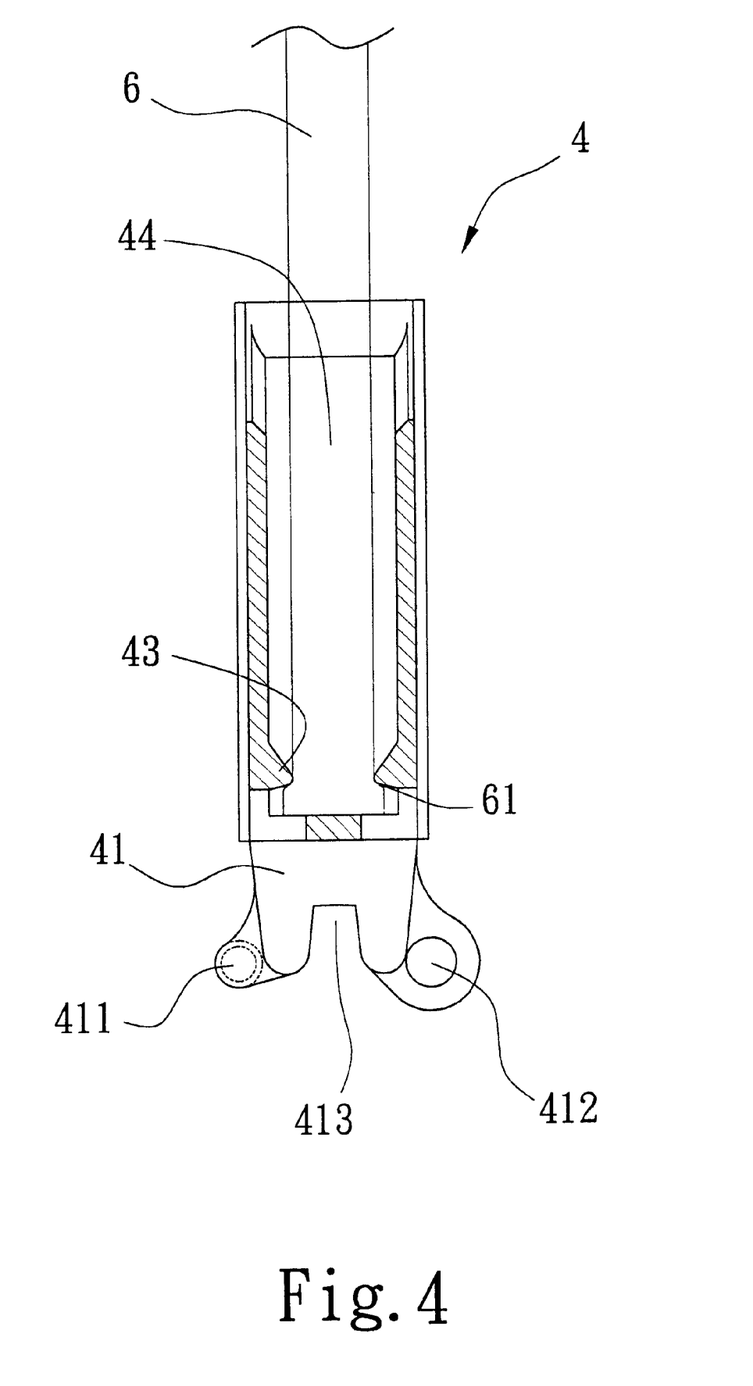
FIG. 4 is a sectional view showing coupling of a clamping seat of the embodiment of the present invention and a CD.
Figure 5A:
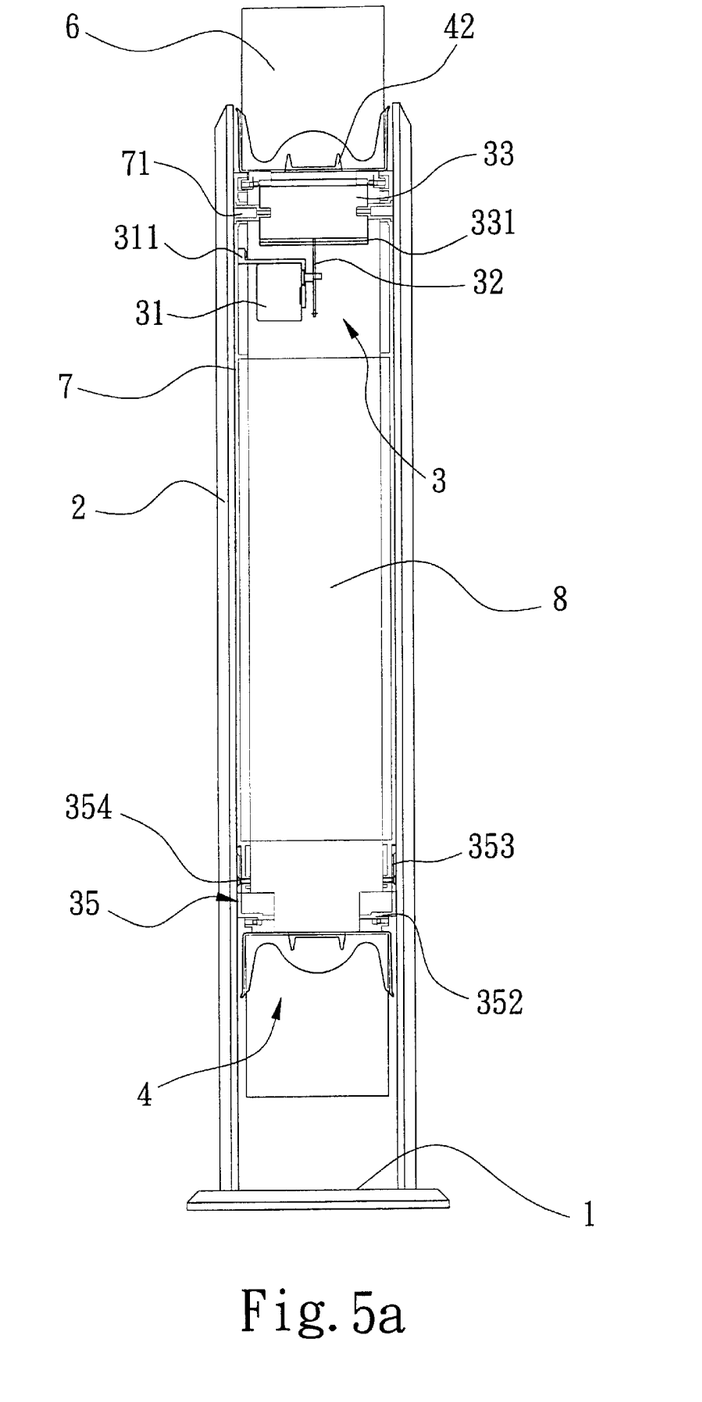
FIGS. 5a and 5b are sectional views of the embodiment of the present invention.
Figure 5B:
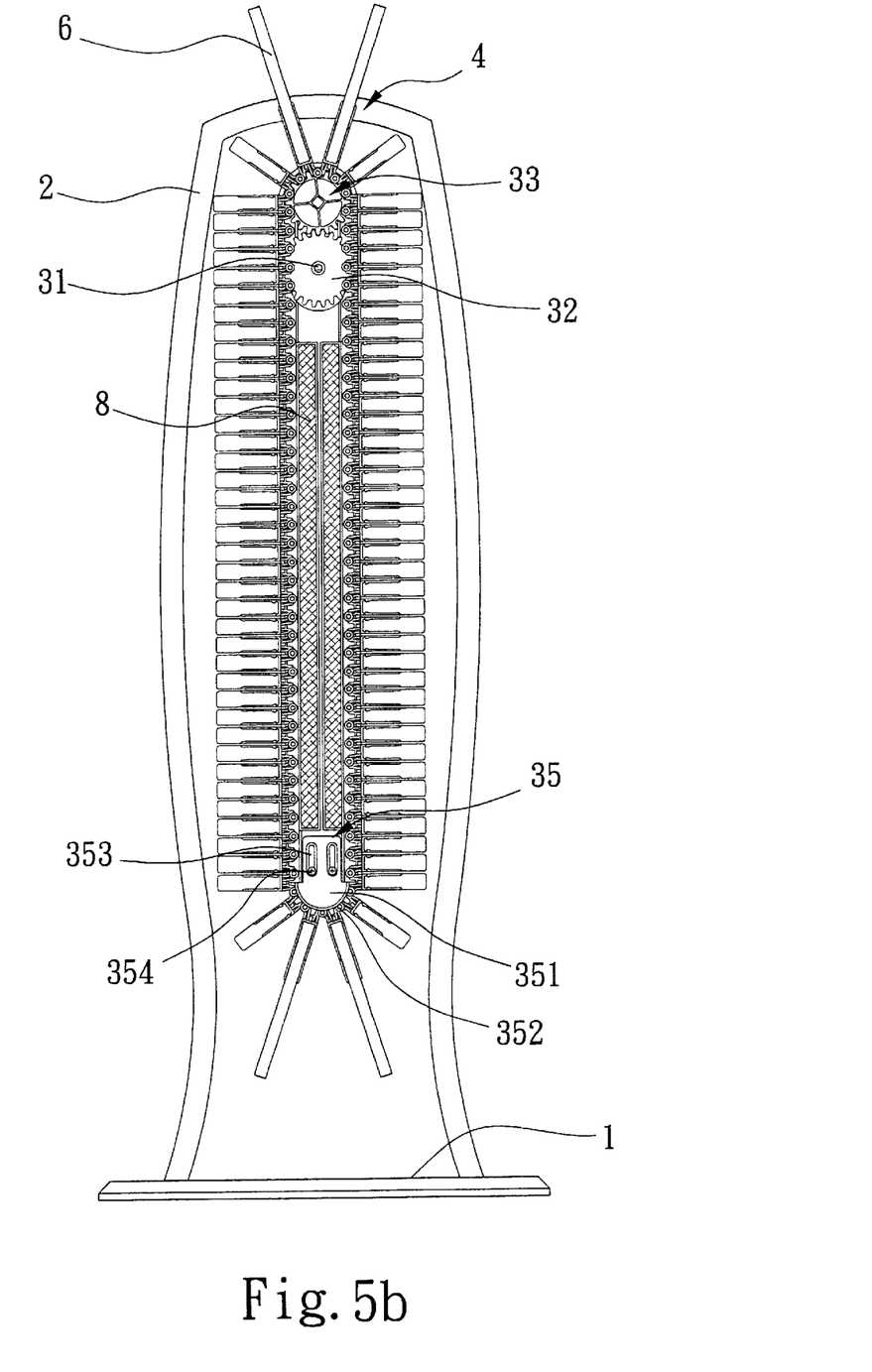
Figure 6:
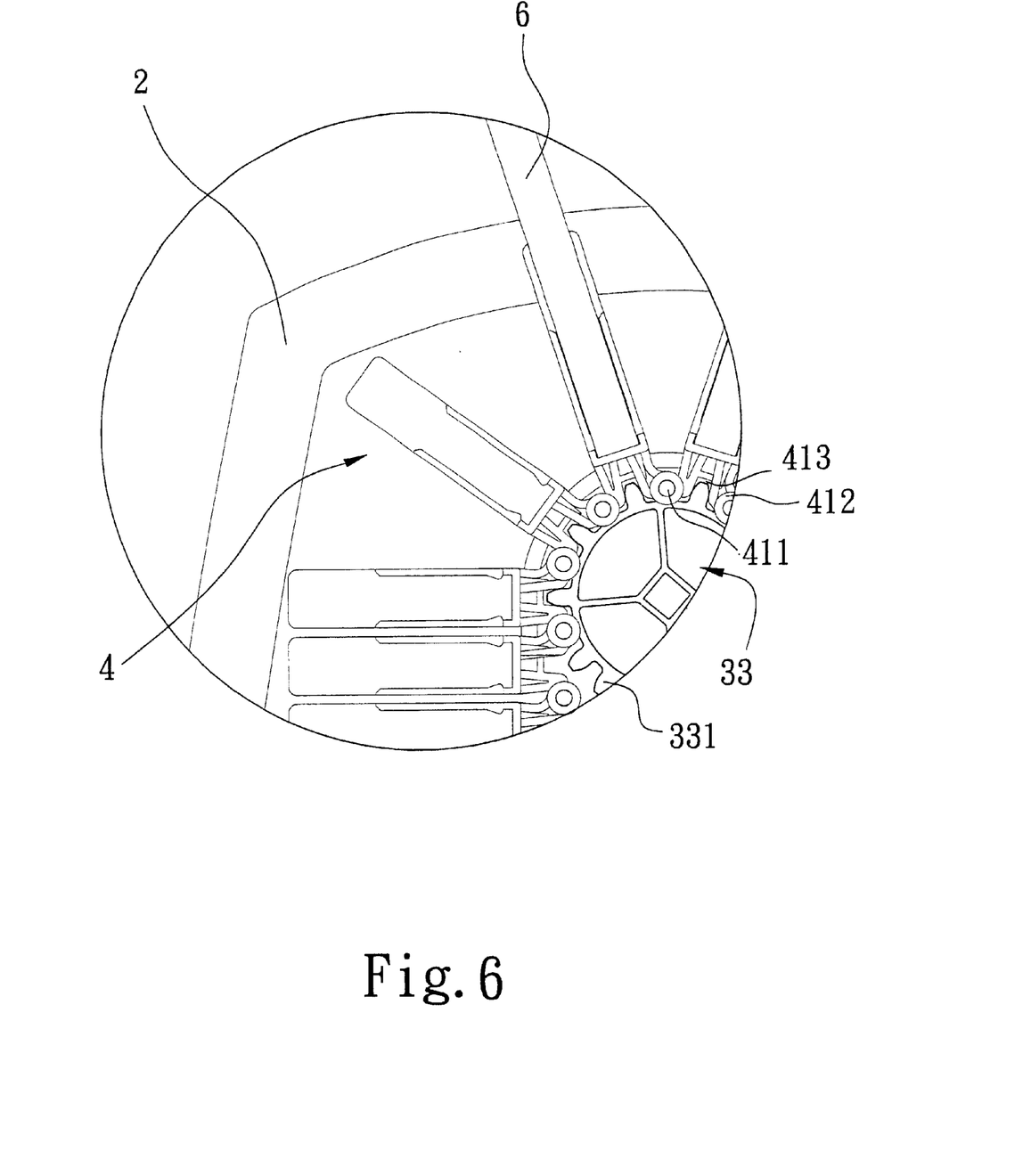
FIG. 6 is a partially enlarged schematic view of the embodiment of the present invention as shown in FIG. 5b.
Figure 7:
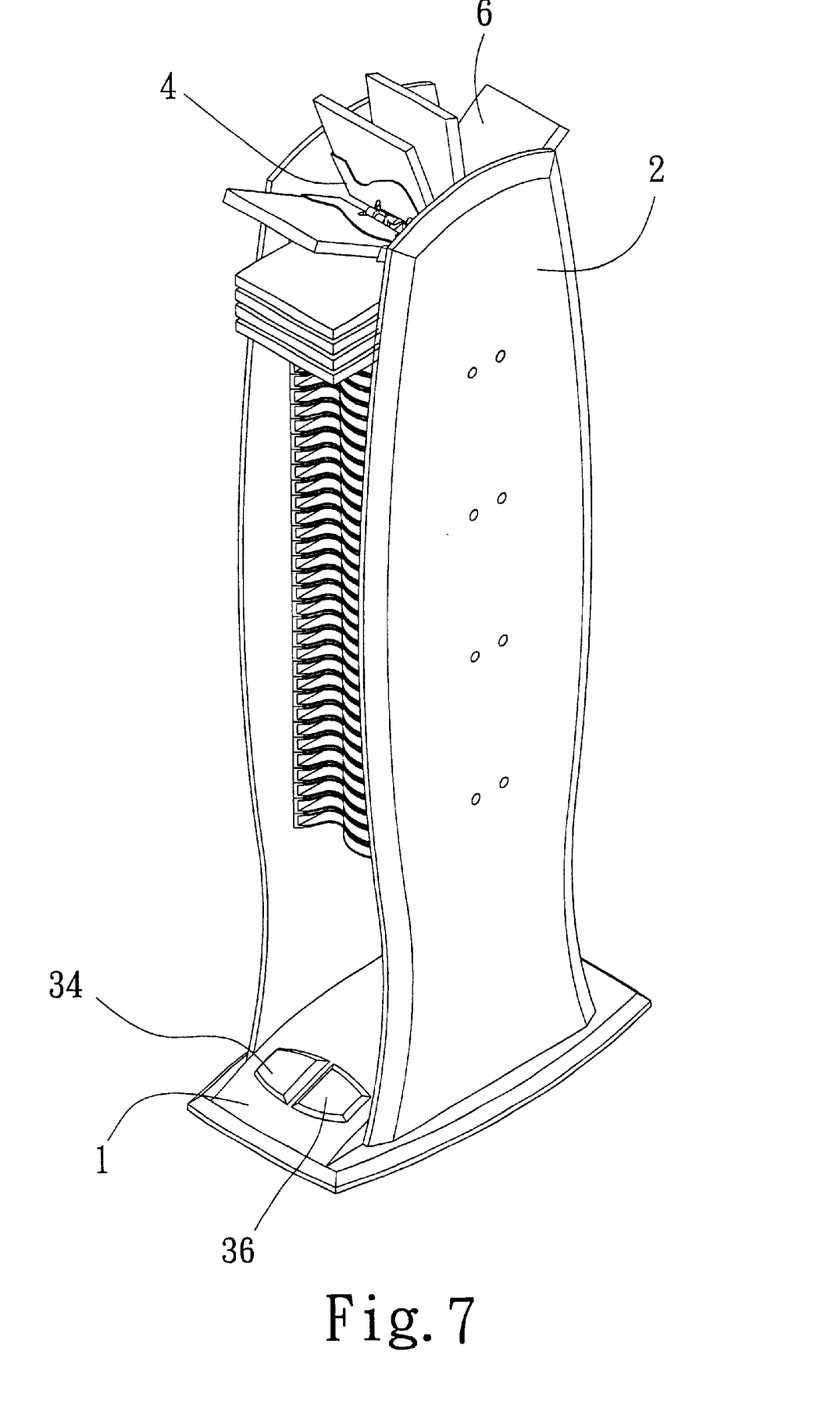
FIG. 7 is a perspective view showing the appearance of the embodiment of the present invention in use.

Referring to FIG. 7, when in use, after assembling the electrically cycling CD rack in accordance with the above sequence, the CD's 6 are inserted into the receiving spaces 44 of the clamping seats 4 and can be clamped firm therein. And with two control peddles 34, 36 provided on the base 1 to control in combination the gearing device 3 to make forward and rearward rotation of the CD's 6 on the clamping seats 4, the electrically cycling CD rack with an effect of convenient assembling as well as fast and stable clamping and having a high storing capacity and with a reduced displaying and storing space is formed.

Figure 8:
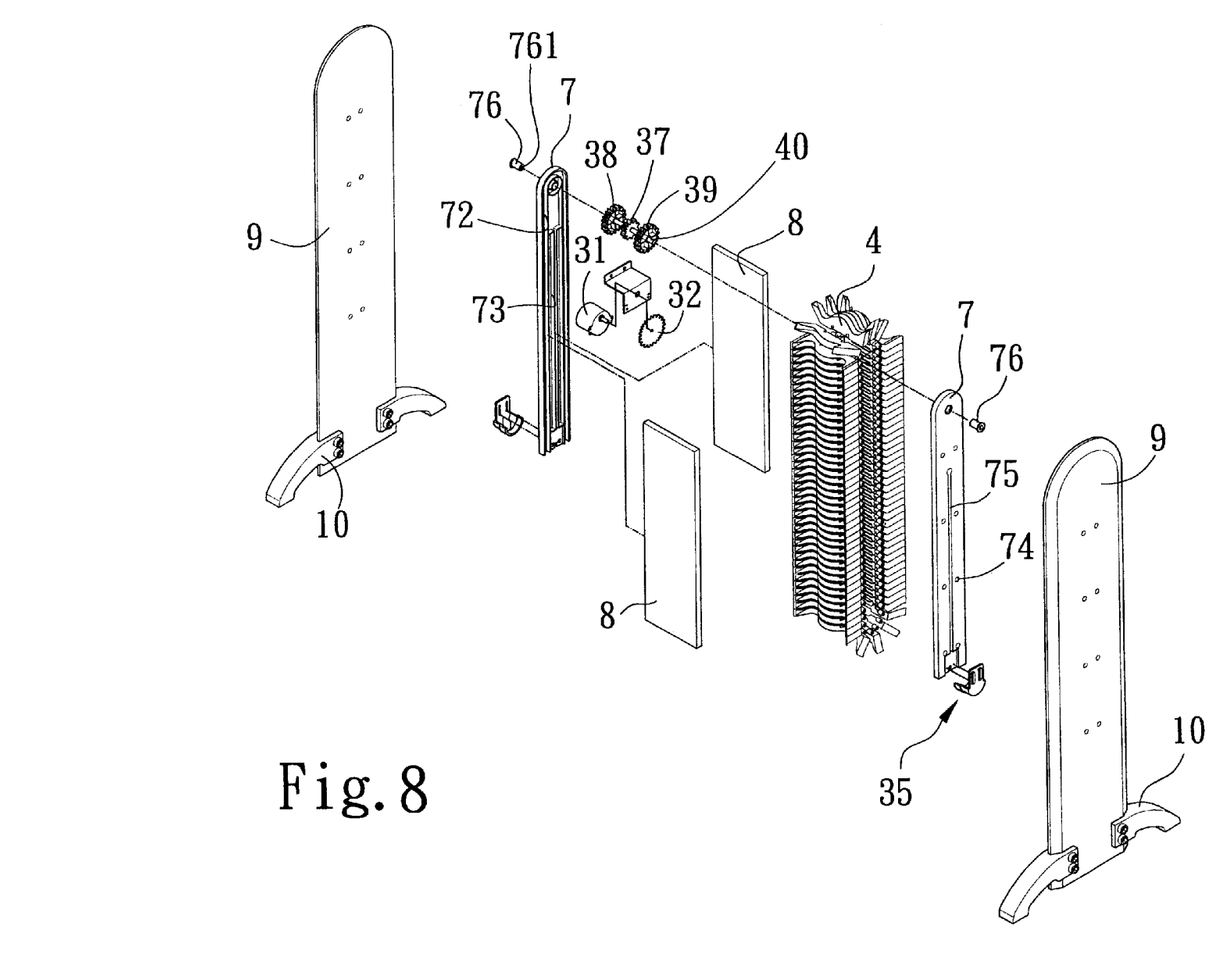
FIG. 8 is an exploded perspective view showing the element of another embodiment of the present invention.

Referring to FIG. 8, the cog device, e.g. the gear box 33, in engagement with the gear 32 provided on the output axle of the motor 31 is substituted by a transverse axle 40 fixedly provided with a gear set having a middle gear 37 and two side gears 38, 39; wherein, the two ends of the transverse axle 40 are rotatably extended into two holes 761 respectively of two axles 76, the gear 32 is engaged with and drives the middle gear 37, while the transverse axle 40 fixedly provided with the middle gear 37 simultaneously moves the two side gears 38, 39 of which the outer teeth are coupled with the clamping seats 4 corresponding therewith, so that the clamping seats 4 can rotate in a mode of circling; and a base 10 is provided beneath each of two lateral plates 9; in this mode, another embodiment of the present invention is formed.

In the embodiment of the present invention as shown in FIGS. 2–5, it is expressed that the gearing device 3 is provided on the inner sides of the two track plates 7 each with an axle 71, the curved groove 72, the two positioning grooves 73 and the holes 74 etc. to connect the two fixing plates 8, the motor 31, the gear box 33, the adjustment box 35 and the clamping seats 4. Thereby, an effect of convenient assembling as well as fast and stable clamping can be provided, a CD rack convenient for viewing and with a reduced displaying and storing space is formed. Actually, the gearing device 3 is provided only at the upper portions of the two lateral plates 2 with the motor 31 of which the output axle is provided thereon with a gear 32; the gear 32 is engaged with the cog device movably and rotatably provided between the two lateral plates 2; the cog device are connected with the clamping seats 4; and the adjustment box 35 is provided under the cog device. With such arrangement, cycling rotation of the mutually connected clamping seats 4 can be obtained.

The present invention has the following advantages:

1. The present invention can get an effect of convenient assembling as well as fast and stable clamping. Thereby, practicality and convenience of the CD rack can be obtained.
2. The present invention provides a plurality of control peddles on a base to connect with a gearing device to manipulate forward and rearward rotation of CD's in their clamping seats, space needed to display and store the CD's can be reduced. Such a CD rack of the present invention is convenient for viewing and has a high storing capacity.

In conclusion, the present invention not only can get rid of the disadvantages resided in conventional CD displaying racks, but also can get an effect of convenient assembling as well as fast and stable clamping by moving the gearing device to rotate the CD's in their clamping seats, and with the designing of mutual connecting of the clamping seats. Further, a CD rack of the present invention convenient for viewing and having a high storing capacity is formed, and it is largely increased in practicality and thus suits various CD displaying racks.

What is claimed is:

1. An electrically cycling CD rack comprising a base, two lateral plates, a gearing device and a plurality of clamping seats, said two lateral plates being joined to said base and extending perpendicularly therefrom, said gearing device being arranged between said two lateral plates and connecting with said clamping seats, said clamping seats respectively having a bottom and two connecting portions arranged at two ends of said bottom, said clamping seats being connected together by connecting neighboring said connecting portions, said connecting portions respectively having a receiving space for firmly clamping a casing of a CD;

said gearing device being arranged between said two lateral plates and having a motor, said motor including an output axle with a gear, said gear engaging a cog device movably and rotatably arranged between said two lateral plates, said cog device connecting with said clamping seats; and an adjustment box being provided under said cog device for connecting to said clamping seats; and said two lateral plates respectively having an inner side with a track plate, said track plate having an upper portion with an axle, said upper portion including a curved groove extending toward said two lateral plates; said track plate having an inside with two positioning grooves formed from raised separating strips, said two positioning grooves having a plurality of holes for firmly connecting with two fixing plates for cycling arrangement of said clamping seats.

2. An electrically cycling CD rack as claimed in claim 1, wherein a linear slit is provided on an outside surface of each of said track plates to hide an electric wire contained therein.

* * * * *